United States Patent [19]

Johnson

[11] 4,244,972
[45] Jan. 13, 1981

[54] MANUFACTURE OF HARD, GRATING CHEESE

[75] Inventor: John D. Johnson, Evanston, Ill.

[73] Assignee: Kraft, Inc., Glenview, Ill.

[21] Appl. No.: 958,053

[22] Filed: Nov. 6, 1978

Related U.S. Application Data

[63] Continuation-in-part of Ser. No. 874,359, Feb. 1, 1978, abandoned, which is a continuation of Ser. No. 716,526, Aug. 23, 1976, abandoned, which is a continuation-in-part of Ser. No. 650,287, Jan. 19, 1976, abandoned, which is a continuation-in-part of Ser. No. 602,425, Aug. 6, 1975, abandoned, which is a continuation-in-part of Ser. No. 481,888, Jun. 21, 1974, abandoned, which is a continuation-in-part of Ser. No. 351,442, Apr. 16, 1973, abandoned.

[51] Int. Cl.³ .............................................. A23C 19/02
[52] U.S. Cl. ....................................... 426/38; 426/582
[58] Field of Search ..................... 426/36, 38, 582, 512

[56] References Cited

U.S. PATENT DOCUMENTS

| | | | |
|---|---|---|---|
| 3,078,169 | 2/1963 | McCadam | 426/36 |
| 3,175,915 | 3/1965 | Murphy | 426/36 |

OTHER PUBLICATIONS

Kosikomski, F., Cheese and Fermented Milk Foods, Published by the Author, Ithaca, N.Y., 1966, (pp. 79, 80, 166–190, 193, 205).
Sander, G. P., Cheese Varieties and Descriptions, U.S. Dept. of Agric. Handbook, No. 54, (pp. 87–88).

*Primary Examiner*—David M. Naff
*Attorney, Agent, or Firm*—Fitch, Even, Tabin, Flannery & Welsh

[57] ABSTRACT

Hard, grating cheese is prepared by a process wherein large masses of curd are assembled, pressed and cured, and wherein the step of brining used in prior art processes is eliminated. In the process, salt is added to milled curd particles having a pH below about 5.1 and fermentable sugars substantially metabolized, the salted curd particles are pressed while withdrawing whey until the curd has moisture content desired in the finished cheese and the curd is cured for a period sufficient to provide hard grating cheese. Since brining is eliminated and the desired moisture content is established prior to curing, the hard grating cheese has substantially no moisture gradient. Consequently, the cheese can be shredded in about 2 to 6 months.

5 Claims, No Drawings

MANUFACTURE OF HARD, GRATING CHEESE

The present application is a Continuation-In-Part of United States Application Ser. No. 874,359, filed Feb. 1, 1978 now abandoned, which is a Continuation of United States Application Ser. No. 716,526, filed Aug. 23, 1976 now abandoned, which is a Continuation-In-Part of United States Application Ser. No. 650,287, filed Jan. 19, 1976 now abandoned, which is a Continuation-In-Part of United States Application Ser. No. 602,425, filed Aug. 6, 1975 now abandoned, which is a Continuation-In-Part of United States Application Ser. No. 481,888, filed June 21, 1974 now abandoned, which is a Continuation-In-Part of United States Patent Application Ser. No. 351,442, filed Apr. 16, 1973 now abandoned.

The present invention relates generally to improvements in the manufacture of hard cheese which is ripened by bacteria. Examples of this type of cheese are Parmesan, Romano, Sapsago, Spalen and Asiago. Such cheeses are sometimes referred to as grating cheese. More particularly, the present invention is directed to improvements in the manufacture of hard, grating cheese, such as Parmesan cheese. Hard grating cheese is a distinct class of cheese and is distinguished from other firm natural cheeses such as Cheddar cheese and Swiss cheese.

The manufacturing process for making Parmesan cheese is typical of the methods used in the manufacture of the class of cheese known as hard, grating cheese. Parmesan is the name in common use outside of Italy, and sometimes in Italy, for a group of hard cheeses that have been made and known in Italy for centuries as Grana. Included in this group of cheeses are Parmigiano, Reggiano, Lodigiano, Lombardy, Emiliano, Venito and Bogozzo. The different cheeses differ in size and shape and in the extent to which the milk is defatted. There are also slight differences in the methods of manufacture.

In general, a known process for manufacture of Parmesan-type cheeses is as follows:

Cow's milk, which has been partially defatted is placed into large copper kettles and is warmed to a temperature between 90° and 98° F. A starter culture containing heat-resistant Lactobacilli and *Streptococcus thermophilus* is added. Yellow cheese coloring may be added. Rennet extract, diluted in water, is added in an amount sufficient to produce curd firm enough to cut in 20 to 30 minutes. The curd is then cut with a cheese harp and cutting and stirring are continued until the particles of curd are about ½ inch in diameter and are uniform in size. The curd is heated in whey for 35 to 50 minutes, with stirring, to a temperature of 115° F. to 125° F. to firm the curd sufficiently.

When the curd is sufficiently firm, stirring is discontinued and the curd is allowed to settle for about 10 minutes. The curd may be pressed in the bottom of the kettle with a presser. The curd is then lifted with a scoop and a cloth, like that used in dipping Swiss cheese curd. The curd in the cloth is lifted and hung up to drain for 20 to 40 minutes. The curd is then placed in a hoop on a drain table. The hoop is about 14 inches in diameter and up to about 4-6 inches deep and produces a cheese weighing about 20 pounds. The cloth is folded over the curd and a circular board is placed on top and pressure is applied. The cloth is changed and the cheese is turned four or five times, frequently at first and then at longer intervals. The cloth is removed and the pressure is increased. The cheese remains under pressure in the hoop for about 20 hours. The cheese is then taken to a salting room which is maintained at a temperature of 60° F. where it is left in the hoop for about three days. The cheese is then removed from the hoop and is salted in brine for 12 to 20 days, depending upon the size of the cheese. The cheese is then dried for 8 to 10 days, usually on shelves, but sometimes in the sun.

The individual cheeses are cured on shelves for about a year in a room which usually is a few degrees cooler than the salting room and which has a relative humidity of 80 to 85 percent. The cheese is turned frequently and is kept clean during the curing period by washing and scraping. It is rubbed with oil from time to time and dark coloring may be rubbed on the surface. After the first curing stage the cheese undergoes a second curing stage where it is usually held by dealers in large curing rooms at a temperature of 54° F. to 60° F. at a relative humidity as high as 90 percent. After the second curing stage the cheese is ready for use.

Fully cured Parmesan is very hard and keeps almost indefinitely. It is easily grated and its primary use is in the form of grated cheese in salads, soups and various foods. During the pressing and in the curing period the cheese loses moisture and the final moisture analysis of the cheese is about 30 to 32 percent by weight. The flavor of Parmesan cheese is distinctive and is a flavor well known to users of this cheese product.

The curing of hard, grating cheese is a lengthy process and takes from 10 to 14 months. It has been thought necessary to provide relatively small curd masses to permit proper drying, brining and curing of the curd mass. In this connection, it has not been thought feasible to produce hard, grating cheese in hoops much larger than the previously described hoop having a diameter of 14 inches and a depth of 4-6 inches. It would be desirable to provide a method for the manufacture of hard, grating cheese, such as Parmesan cheese, wherein the curd is cured in large quantities. It would also be desirable to provide a method for the manufacture of hard, grating cheese where the brining step is eliminated.

Accordingly, it is a principal object of the present invention to provide an improved method for the manufacture of hard, grating cheese. It is another object of the present invention to provide an improved method for the manufacture of hard, grating cheese wherein large curd masses are cured.

These and other objects of the invention will become more apparent from the following detailed description.

Generally, in accordance with various features of the present invention, hard, grating cheese is manufactured by a method wherein large curd masses are assembled, pressed and cured. The method of the invention eliminates the step of brining used in prior art processes for the manufacture of hard, grating cheese.

In the method, curd suitable for the manufacture of hard, grating cheese is prepared from cow's milk which has been partially skimmed. The cow's milk contains sufficient fat to provide a final cheese product having a fat level of from about 28 to about 44 percent fat on a dry basis. The milk may be pasteurized or heat treated. The temperature of the milk is then adjusted to about 90° F. and a starter culture is added. Calcium chloride may be added to assist coagulation. If used, calcium chloride is added at a level of up to about 0.02 percent by weight based on the milk. The starter culture used is a mixture of *L. bulgaricus* which is used at a level of from about 0.5 to about 1.0 percent by weight of the milk and *S. thermophilus* which is used at a level of from about 0.20 to about 0.75 percent by weight of the milk. The starter cultures are added to the milk in the form of a viable liquid culture. The milk is then ripened for a period of from about 10 minutes to about 60 minutes and rennet is added. About 3 ounces of rennet are used for each 1,000 pounds of milk. A lipase is sometimes used if stronger flavor is desired, particularly for Romano cheese. A coagulum forms within a period of about 15 to 20 minutes after addition of the rennet. The coagulum is then cut with knives to form curd particles in whey.

The curd is stirred in the whey for a period of from about 5 to about 60 minutes from the time that the curd is cut. Heating of the curd is then initiated. The curd is heated in the whey to a temperature of from about 110° F. to about 120° F. over a period of time of from about 20 to about 30 minutes. The curd is gently agitated in the whey during the heating period. The curd is then held in the whey for a period of time of from about 20 to about 30 minutes at the elevated temperature.

Thereafter, the curd and whey are pumped to a container provided with perforations for the purpose of draining the whey from the curd. A preferred container is known as a universal cheese maker (UCM). UCM construction is described in detail in U.S. Pat. No. 2,494,637 to Stine. Generally, the UCM comprises a perforated basket within an imperforate tank. An outlet is located at the bottom of the tank to permit whey drainage.

It is preferred that the UCM tank be at least partially filled with curd and whey prior to starting drainage of the whey from the bottom of the tank. If whey drainage is started immediately, air pockets may form in the body of the curd. The formation of air pockets tends to result in the production of fines during the subsequent milling step and it is desirable to limit the production of fines.

While the whey is draining or shortly after draining is finished, it is preferred to press the curd. Pressing can be effected by placing a perforated plate and weight over the surface of the curd in the container. The weight is sufficient to establish a pressure on the surface of the curd of from about 0.2 to about 25 psi. The purpose of pressing the curd in the container, if done, is to aid in establishing desired matting of the curd during the development of acid in the curd while the curd is held in the container.

The curd is held with the plate in place on the surface of the curd until the pH of the curd is 5.1 or less, and fermentable sugars in the curd are metabolized by the starter cultures. In this connection, a curd pH of less than 5.1 is usually established in a period of three hours or less. However, the attainment of a curd pH of 5.1 or less without metabolization of the sugars present is not sufficient. If the curd is milled while the curd pH is 5.1 or less and metabolizable sugars remain, the resultant hard grating cheese has a pronounced tendency to brown during subsequent curing and utilization. Such browning is considered highly undesirable.

Accordingly, it is an important step of the present invention that fermentation of the curd continue until the metabolized sugars are fermented by the starter cultures before the curd is milled. This is a distinct departure from prior art methods for making other types of cheese, such as Cheddar cheese, wherein a draining and pressing step are used. In the manufacture of Cheddar cheese, it is desirable to have a curd pH of greater than 5.4 at the time of milling the curd. However, at the time of milling the curd, there is a substantial level of fermentable sugars still present in Cheddar cheese curd. These fermentable sugars are metabolized during the curing step, since the levels of salt used in the manufacture of Cheddar cheese (1.75 percent by weight of the curd) is not sufficient to inhibit further fermentation of sugar during curing. It should be recognized that because the method of the present invention utilized direct salting at high levels, as explained more fully hereinafter, the growth of the starter cultures is terminated after salting and starter cultures are not available for metabolization of the sugars during the curing period.

During the time that the curd is held to metabolize fermentable sugars, the curd pH reaches a terminal level within the range of 4.80 to 4.90 (the exact pH being dependent upon the particular milk used) and remains at the terminal pH for remaining steps in the processing of the curd in accordance with the invention.

It should be understood that the time required during the fermenting period to establish the desired pH and to substantially metabolize the fermentable sugars is dependent upon the termperature at which the fermentation occurs. In a preferred embodiment of the invention, the UCM is covered with plastic or other suitable material. During the fermentation period with the covering in place, heat production by growth of the starter culture is sufficient to maintain the temperature of the curd fairly constant. In general, the curd is heated in the vat during the make procedure to a temperature in the range of from about 110°–118° F. For a curd temperature during fermentation in the range of 110°–118° F. the desired pH and the metabolization of fermentable sugars occur within a period of 4–20 hours. For other temperatures of fermentation other times will be required.

A simple test has been devised to determine when the fermentation of the metabolizable sugars is finished. In the test, a 10 gram sample of the curd is placed 4–6 cm from the surface of a 250 watt infrared bulb. The curd is maintained in this position for a period of 15 minutes. During this holding period a temperature of about 400° F. is established at the surface of the curd sample. If browning of the curd sample does not occur during the test period, the fermentation is considered to be complete although some residual fermentable sugars may still be present.

After completion of the fermentation, the covering is removed. It is then preferred to cool the curd to a temperature in the range of 90°–105° F. prior to milling the curd. Cooling of the curd is desirable to prevent fat loss during subsequent milling of the curd. However, if the temperature of the curd is reduced to below about 90° F., the curd particles produced during the milling step are too hard and knitting of the curd during curing is retarded. Generally, cooling of the curd to a temperature within the indicated range is effected in a period of about 3 to 10 hours in a room maintained at 80° F. During the cooling period any residual fermentable sugars are metabolized.

After fermentation of the curd and after the curd has been allowed to cool, the curd is cut into slabs and the slabs are milled to provide particulate curd. It is preferred to use a mill capable of dicing the curd into generally rectangular or cubicle pieces without production of excessive fines. Conventional curd mills used to mill Cheddar curd are suitable for use in milling the curd of the invention. The total time lapse from draining the curd to milling the curd to attain desired fermentation and cooling is from about 7 to about 30 hours.

Salt is then added to the curd at a level sufficient to provide from about 2.5 to about 3.5 percent by weight of salt in the curd during curing of the curd. This is equivalent to a salt level of from about 7 to about 12 percent based on the moisture of the finished cheese. If the salt level is below the indicated range, the curd cannot be cured for the lengthy period of time desired without development of undesirable effects, such as gas formation and lack of flavor development. If the level of salt is above the indicated range, the time required for curing the curd is greatly extended. It should be understood that this level of salt in the curd is considerably higher than the level of salt used in the manufacture of some other types of cured cheese, such as Cheddar cheese and Swiss cheese.

It is preferred to use fine salt wherein the salt has a particle size of less than 20 mesh, U.S. Standard Sieve size when a close knit final cheese is desired. The fine salt dissolves rapidly and the rapid dissolution of the salt prior to pressing has been found to be beneficial to attain a well knitted final cheese after curing. Coarse granular salt, wherein at least 50 percent of the salt has a particle size between 16 and 20 mesh is sometimes preferred if it is desired to permit still further fermentation activity prior to attaining salt equilibrium.

After salting, the curd is transferred to a large container. The method of the present invention is suitable for curing curd masses in containers capable of holding from about 50 to about 700 pounds of curd. A particularly preferred size of container is a 55 gallon cylindrical barrel which has a capacity of about 500 pounds of curd. Prior to placing the curd in the container, imperforate plastic liners are placed in the container to receive the curd if the curd is to be cured in the container. The curd, however, can be removed from the container after pressing and can be cured exteriorly of the container. An extension may be placed upon the top of the container to receive the initial charge of curd. After the container is filled with curd, a pressing cloth is placed over the top of the curd. A perforated pressing plate is then lowered onto the top surface of the curd and the containers are removed to a pressing station.

Pressure is then applied to the pressing plate. To attain a close knit of the curd the pressure is applied at a level and for a time sufficient for the curd to lose its elasticity. If a close knit is not required, the pressing can take place at a lower pressure or a lessened time sufficient to drain the curd and reduce the moisture to less than about 34 percent by weight. In general, pressure of from about 2 to about 50 psig on the surface of the cheese for a period of from about 5 to about 50 hours is sufficient to remove the curd elasticity. The longer time being used at lowest pressure, the shorter time at the highest pressure and equivalent intermediate times being used at intermediate pressures. As an example of a suitable time and pressure, 12 psig for 18-20 hours is sufficient to remove the curd elasticity and provide a closely knitted curd. It should be understood that the ranges set forth for pressure and time are representative of practical conditions for achieving a closely knit curd. At lower pressures or lower times the curd knit is less but is entirely suitable for the preparation of hard grating cheese which is intended to be grated prior to marketing. Higher pressures and longer times are not detrimental but are not necessary and are not considered to be practical.

At some time during the pressing operation, the container is inclined from the vertical so as to remove the whey which accumulates in the top of the container. In general, the moisture of the curd is reduced to less than about 34 percent by weight during the pressing step. In the manufacture of Romano cheese, the moisture is reduced to within the range of from about 32 percent to less than 34 percent. In the manufacture of Parmesan cheese, a moisture of from about 28 percent to less than 32 percent is attained.

After the curd has been pressed, the curd in the container may be subjected to vacuum to further deaerate the curd. Generally, subjecting the curd to from about 25 to about 28 inches vacuum for a period of ½ hour to about 2 hours is sufficient. During vacuum treatment, if used, a weight is placed on the surface of the cheese to establish a pressure on the surface of the curd during vacuum treatment sufficient to prevent the curd from expanding during the vacuum treatment. After the vacuum treatment, the weight is allowed to remain on the cheese from about 1 to 20 hours. It should be understood that vacuum treatment is optional and is not required.

The curd may then be sealed in the container with a gasketed cover or by other suitable means. Alternatively the curd block may be removed from the container and placed in a flexible bag. Vacuum is applied to collapse the bag around the curd and remove any air from between the surface of the curd and the bag. The curd is then cured within the bag. The curd is cured at a temperature of from about 55° F. to about 65° F. The curing time to produce hard, grating cheese which complies with standards of the United States is at least about 10 months. It has been necessary with prior known procedures for making brined, hard, grating cheese to cure the cheese for 10 months or longer to reduce the moisture in the center of the cheese "wheels" to a level sufficiently low to permit shredding. During the brining step of prior known procedures a moisture gradient from the outside to the inside was established. While the average moisture for the cheese "wheel" was suitable for shredding, the interior moisture was too high. However, since the method of the present invention eliminates brining and the desired moisture is established prior to beginning the curing step, the hard, grating cheese of the invention has substantially no moisture gradient. Consequently, the hard grating cheese of the invention can be shredded after relatively short curing periods of about 2 to 6 months.

The following example further describes particular features of the present invention but is intended to in no way limit the scope of the invention which is defined in the appended claims.

EXAMPLE I

Parmesan cheese is made by the method of the present invention. Ten thousand pounds of milk are adjusted in fat content to contain 2.1 percent milk fat for producing Parmesan cheese. The milk is heat treated at a temperature of 161° F. for 15 seconds hold time. 0.8 percent by weight of a viable liquid culture of *L. bulgaricus* and 0.25 percent by weight of a viable liquid culture of *S. thermophilus* are added to the milk which is at a temperature of 90° F. The milk is permitted to ferment for a period of 45 minutes and 2.5 ounces of single strength rennet per 1,000 pounds of milk is then added. The milk coagulates about 20 minutes after addition of the rennet. The coagulum is then cut with ¼ inch knives to provide curd particles in whey. The curd is stirred in the whey for about 55 minutes. The curd is then heated in the whey over a 25 minute period to a temperature of 115° F. The curd is stirred throughout the heating period. The curd is then maintained in the whey at a temperature of 115° F. for a period of 30 minutes.

The curd and whey mixture is then pumped to a UCM. Draining of the whey is then initiated and a pressing plate is applied to the surface of the curd. The whey is drained from the curd. The curd forms a bed 8 inches deep in the drainer. A pressure of 0.5 psi is applied to the surface of the curd by means of the pressing plate and the curd is fermented for a period of 6 hours. During the fermentation period the UCM is covered with a plastic sheet. At the end of the fermentation period the pH of the curd is 4.85 as determined by the gold electrode quinhydrone method and the curd is matted. A 10 gm piece of the curd is placed 5 cm inches beneath a 250 watt infrared lamp. The curd piece is held beneath the lamp for 15 minutes and no browning is observed.

The plastic sheet is removed and the matted curd is allowed to cool to a temperature of about 100° F. over a period of 9 hours. The cooled curd is cut into slabs and the slabs are milled using a Cheddar cheese mill. The milled curd is transferred to a drain table. The curd is stirred as fine salt having a particle size of less than 20 mesh U.S. Standard Sieve size is added at a level sufficient to provide 3.0 percent salt in the curd during the curing step. Thereafter, the salted curd is transferred to a 55 gallon drum which is lined with a plastic liner. The 55 gallon drum holds 500 pounds of curd. The top of the curd is dressed with cheesecloth and a perforated plate is applied to the surface of the curd.

A force is applied to the plate to push the curd downwardly into the drum beneath the upper surface of the drum. The drum is then tilted at an angle of 45° to the horizontal and a pressure of 12 psig is established on the surface of the curd by means of a hydraulic ram bearing against the pressing plate. The pressing is continued and whey is drained from the curd for a period of 18 hours. After pressing, the drum is returned to a vertical position and the pressing plate is removed. Samples are then removed from the curd and the curd is found to containe 30.5 percent moisture.

Thereafter the curd is sealed in the drum and is cured in the drum at a temperature of 57°–59° F. for 10 months. After 10 months the curd is found to have a desirable Parmesan cheese texture and flavor and a desirable Parmesan cheese shred is obtained when the curd is subjected to shredding.

What is claimed is:

1. A method for the manufacture of hard, grating cheese comprising providing curd particles in whey, separating said whey from said curd particles, holding said curd particles under pressure and fermenting said curd particles for a period of time (sufficient that the pH of said curd is less than) of from about 4 to about 20 hours at a temperature of from about 110° F. to about 118° F. to develop acidity and to provide a pH of from about 4.8 to about 5.1 and so that the fermentable sugars are substantially metabolized, permitting said curd particles to mat during the development of said pH, cooling said curd to a temperature of from about 90° F. to about 105° F., milling said cooled curd, adding salt to said milled curd, said salt being added to said curd at a level sufficient to provide from about 2.5 to about 3.5 percent by weight of salt in said curd during curing of said curd, placing said salted curd into containers, pressing said curd in said containers, withdrawing whey from said curd during said pressing until the moisture level (desired in the finished cheese is attained) is from about 28 percent to about 34 percent by weight of said curd and curing said curd in said containers for a sufficient period of time to provide a hard, grating cheese.

2. A method in accordance with claim 1 wherein said curd in said containers is subjected to vacuum after said pressing.

3. A method in accordance with claim 1 wherein said milling is effected by means of a Cheddar cheese curd mill.

4. A method in accordance with claim 1 wherein said cooling takes place over a period of from about three hours to about ten hours after said fermentation period.

5. A method in accordance with claim 1 wherein said pressing of said curd in said containers is at a pressure of from about 2 to about 50 psig (and) for a time of about 5 to about 50 hours (sufficient for the curd to lose its elasticity).

* * * * *

UNITED STATES PATENT AND TRADEMARK OFFICE
CERTIFICATE OF CORRECTION

PATENT NO. : 4,244,972

DATED : January 13, 1981

INVENTOR(S) : John Johnson

It is certified that error appears in the above—identified patent and that said Letters Patent is hereby corrected as shown below:

On the cover of the Patent in the References Cited, delete "3,078,169 2/1963 McCadam 426/36" insert --3,078,170 2/1963 Leber 426/36--.

On the cover of the Patent in Other Publications, first reference, delete "Kosikomski" insert --Kosikowski--.

Signed and Sealed this

Eighth Day of September 1981

[SEAL]

Attest:

GERALD J. MOSSINGHOFF

Attesting Officer

Commissioner of Patents and Trademarks